(12) United States Patent
Chen et al.

(10) Patent No.: US 7,443,069 B2
(45) Date of Patent: Oct. 28, 2008

(54) STATOR STRUCTURES

(75) Inventors: Lee-Long Chen, Taoyuan Hsien (TW); Shih-Ming Huang, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 139 days.

(21) Appl. No.: 11/211,586

(22) Filed: Aug. 26, 2005

(65) Prior Publication Data

US 2006/0043813 A1 Mar. 2, 2006

(30) Foreign Application Priority Data

Aug. 27, 2004 (TW) ............................... 93125876 A

(51) Int. Cl.
*H02K 1/00* (2006.01)
(52) U.S. Cl. .................. 310/181; 310/154.26; 310/254
(58) Field of Classification Search ............... 310/181, 310/154.02–154.34, 154.35, 154.36, 154.37, 310/154.41, 272; *H02K 3/00, 1/00, 19/26, H02K 23/22*
See application file for complete search history.

(56) References Cited

U.S. PATENT DOCUMENTS

| | | | | |
|---|---|---|---|---|
| 3,214,620 A | * | 10/1965 | Smith et al. ................. | 310/181 |
| 3,566,251 A | * | 2/1971 | Hoglund ....................... | 322/46 |
| 4,023,057 A | * | 5/1977 | Meckling ................ | 310/154.07 |
| 4,293,787 A | * | 10/1981 | Ito et al. ...................... | 310/181 |
| 4,745,312 A | * | 5/1988 | Nagasaka .................. | 310/49 R |
| 5,266,859 A | * | 11/1993 | Stanley ....................... | 310/216 |
| 5,920,139 A | * | 7/1999 | Fujiwara et al. ............. | 310/154 |
| 6,013,966 A | | 1/2000 | Fehrenbacher et al. | |
| 6,130,494 A | * | 10/2000 | Schob ........................ | 310/90.5 |
| 6,133,664 A | * | 10/2000 | Torok et al. .................. | 310/181 |
| 6,262,508 B1 | * | 7/2001 | Shibayama et al. ......... | 310/181 |
| 6,844,656 B1 | * | 1/2005 | Larsen et al. ............... | 310/268 |
| 2003/0122440 A1 | * | 7/2003 | Horst ........................ | 310/181 |
| 2006/0043813 A1 | * | 3/2006 | Chen et al. .................. | 310/181 |

FOREIGN PATENT DOCUMENTS

DE 3424402 C * 8/1985
JP 11289726 A * 10/1999

* cited by examiner

*Primary Examiner*—Thanh Lam
(74) *Attorney, Agent, or Firm*—Birch, Stewart, Kolasch & Birch, LLP

(57) ABSTRACT

Stator structures are provided. A stator structure includes at least a magnetic conductive layer and at least a first auxiliary magnetic polar layer. The magnetic conductive layer comprises a plurality of first salient poles. The first auxiliary magnetic polar layer is disposed above the magnetic conductive layer, below the magnetic conductive layer, or between two magnetic conductive layers. The first auxiliary magnetic polar layer comprises at least a second salient pole and a third salient pole. The total number of the second and the third salient poles is equal to that of the first salient poles. The second salient pole comprises permanent magnetic material.

19 Claims, 11 Drawing Sheets

STATOR STRUCTURES

BACKGROUND OF THE INVENTION

1. Field of the Invention

The invention relates to stator structures.

2. Description of the Related Art

FIG. 1 shows the structure of a conventional brushless direct current (DC) motor disclosed by U.S. Pat. No. 6,013,966. The brushless DC motor includes a stator structure.

The stator structure includes a top yoke 10 and a bottom yoke 20. A power coil is wound between the top yoke 10 and the bottom yoke 20. The stator structure is an axial stator structure. A plurality of salient poles 1 conducts corresponding poles to drive a rotor 2 to rotate when the power coil is supplied with current.

The brushless DC motor further includes two permanent magnets 3 disposed outside the rotor 2 for fixing the rotor 2 at a start-up position, thus providing an appropriate start-up torque.

To generate a sufficient start-up torque, two permanent magnets 3 are located at two fixed positions. The included angle between the stator and each permanent magnet 3 is precisely θ. To fix the rotor 2 at a start-up position utilizing the two permanent magnets 3, the rotor 2 is covered with a non-magnetic conductive material such as plastics.

However, the magnetic force between the stator and the rotor 2 is reduced by the block of the non-magnetic conductive material to influence, and a torque of the rotor 2 is influenced during rotation.

SUMMARY OF THE INVENTION

Stator structures are provided. An exemplary embodiment of a stator structure comprises at least a yoke with at least an arm, at least a magnetic conductive layer and at least a first auxiliary magnetic polar layer. The magnetic conductive layer, connected to the arm, comprises a plurality of first salient poles. The first auxiliary magnetic polar layer is disposed above the magnetic conductive layer, below the magnetic conductive layer, or between two magnetic conductive layers. The first auxiliary magnetic polar layer comprises at least a second salient pole and a third salient pole, wherein the total number of the second and the third salient poles is equal to that of the first salient poles, and the second salient pole comprises permanent magnetic material.

Some embodiments of a stator structure comprise at least a yoke with at least an arm, at least a magnetic conductive layer, at least a first auxiliary magnetic polar layer, and at least a second auxiliary magnetic polar layer. The magnetic conductive layer, connected to the arm, comprises a plurality of first salient poles. The first auxiliary magnetic polar layer is disposed above the magnetic conductive layer. The first auxiliary magnetic polar layer comprises at least a second salient pole and a third salient pole, wherein the total number of the second and the third salient poles is equal to that of the first salient poles, and the second salient pole comprises permanent magnetic material. The second auxiliary magnetic polar layer is disposed below the magnetic conductive layer or between two magnetic conductive layers. The second auxiliary magnetic polar layer comprises at least a fourth salient pole and a fifth salient pole, wherein the fourth and the fifth salient poles are disposed corresponding to positions of the second and the third salient poles respectively, and the fourth salient pole comprises permanent magnetic material.

Some embodiments of a stator structure comprise at least a yoke with at least an arm, at least a magnetic conductive layer and at least a first auxiliary magnetic polar layer. The magnetic conductive layer, connected to the arm, comprises a plurality of first salient poles. The first auxiliary magnetic polar layer comprises at least a second salient pole, wherein the second salient pole comprises permanent magnetic material.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Stator structures will be described in greater detail in the following.

In an exemplary embodiment of a stator structure, a permanent magnet is disposed on a stator and inside a rotor to drive the rotor to rotate, thus eliminating the need for a permanent magnet to be located at a precise position.

Figure 1:
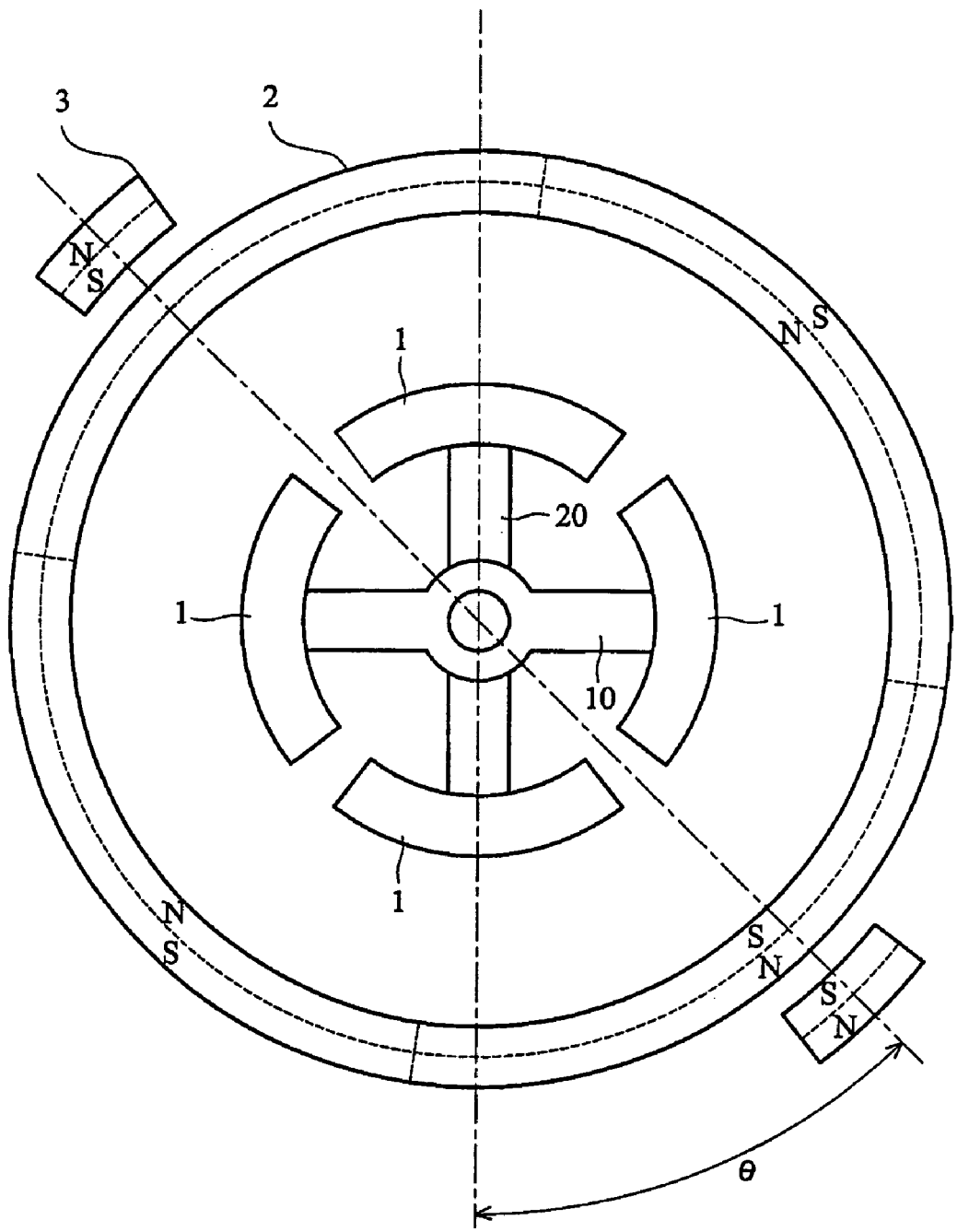
FIG. 1 shows the structure of a conventional brushless direct current (DC) motor.
Figure 2A:
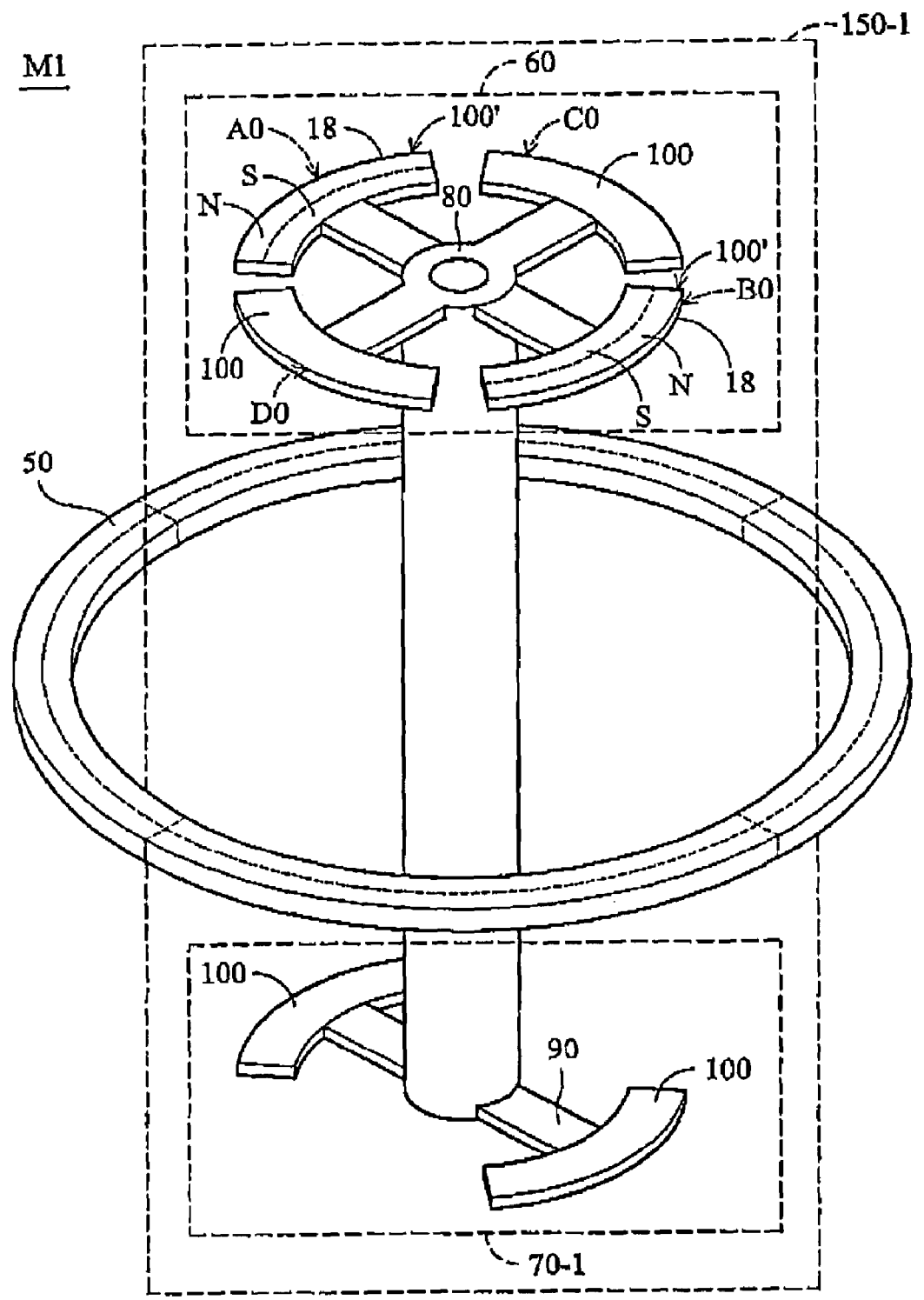
FIG. 2A shows the structure of a first embodiment of a brushless direct current (DC) motor.

FIG. 2A shows the structure of a brushless direct current (DC) motor M1 of a first embodiment. The brushless DC motor M1 comprises a stator 150-1 and a rotor 50. The rotor 50 is an annular magnet disposed around the stator 150-1 and coaxial with the stator 150-1. The stator 150-1 is an axial stator structure comprising a first portion 60 and a second portion 70-1.

The first portion 60 with four magnetic poles A0, B0, C0 and D0 comprises a first yoke 80 with four arms, two corresponded salient poles 100, and two corresponded salient poles 100' alternatively disposed between the salient poles 100. The two salient poles 100 and the two salient poles 100' are connected to each of the four arms. Each salient pole 100' is formed by a permanent magnet 18, and two permanent magnets 18 of the salient poles 100' are symmetrically disposed between two salient poles 100 of the first portion 60.

The outer edge, magnetically N-pole, of the permanent magnets 18 of the salient poles 100' is an auxiliary magnetic polar for driving the rotor 50 to rotate. The second portion 70-1 comprises a second yoke 90 and two spaced salient poles 100.

Figure 2B:
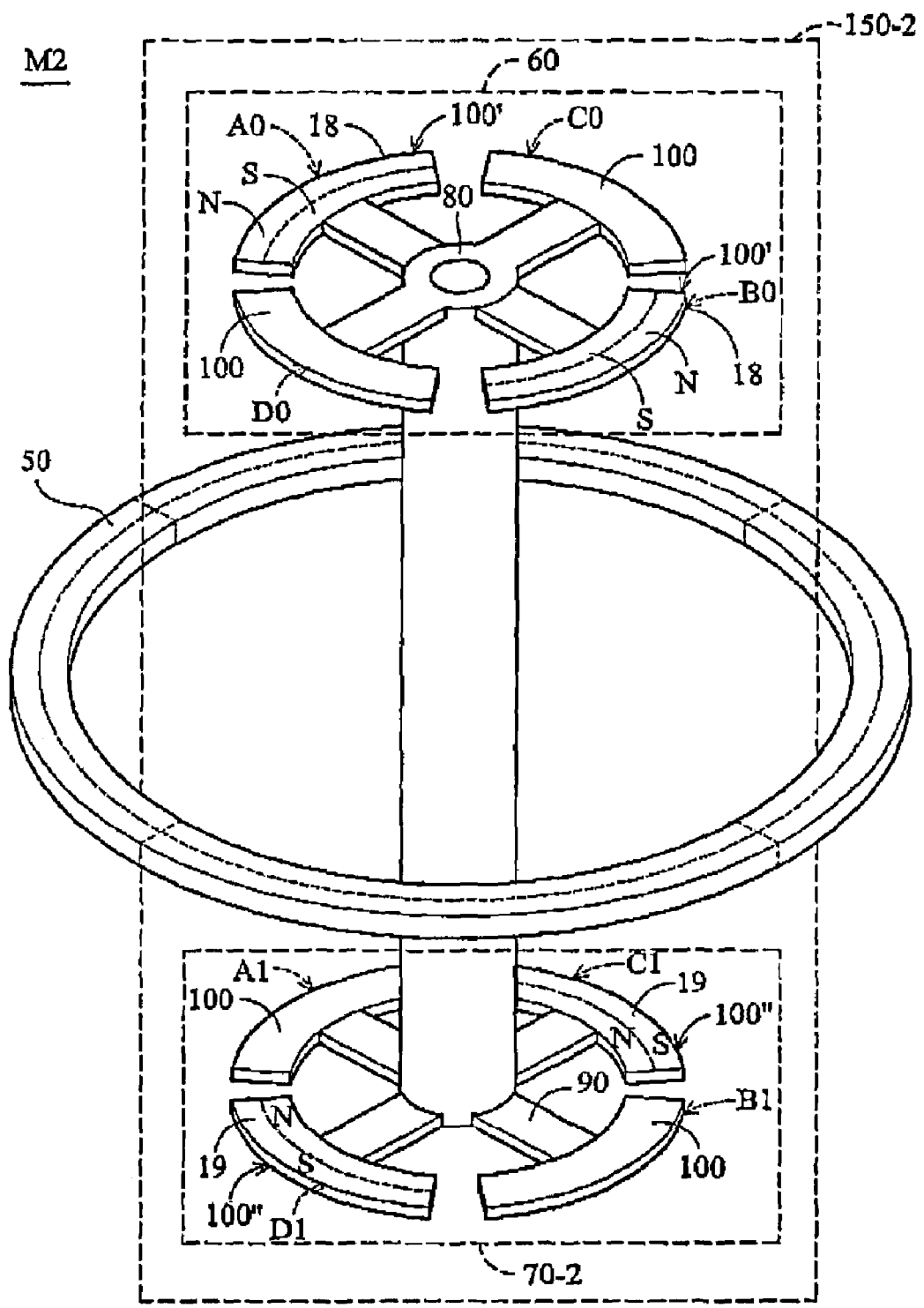
FIG. 2B shows the structure of a second embodiment of a brushless direct current (DC) motor.

FIG. 2B shows the structure of a second embodiment of a brushless direct current (DC) motor M2. The motor M2 differs from the motor M1 in that two salient poles 100" are further disposed between the salient poles 100 of the second portion 70-2 of the stator 150-2, to form a plurality of magnetic poles A1, B1, C1 and D1 in the second portion 70-2. Each salient pole 100" has a permanent magnet 19 on the top layer thereof second stator. The outer edge, magnetic S-pole, of the permanent magnet 19 is an auxiliary magnetic polar for driving the rotor 50 to rotate.

Figure 3:
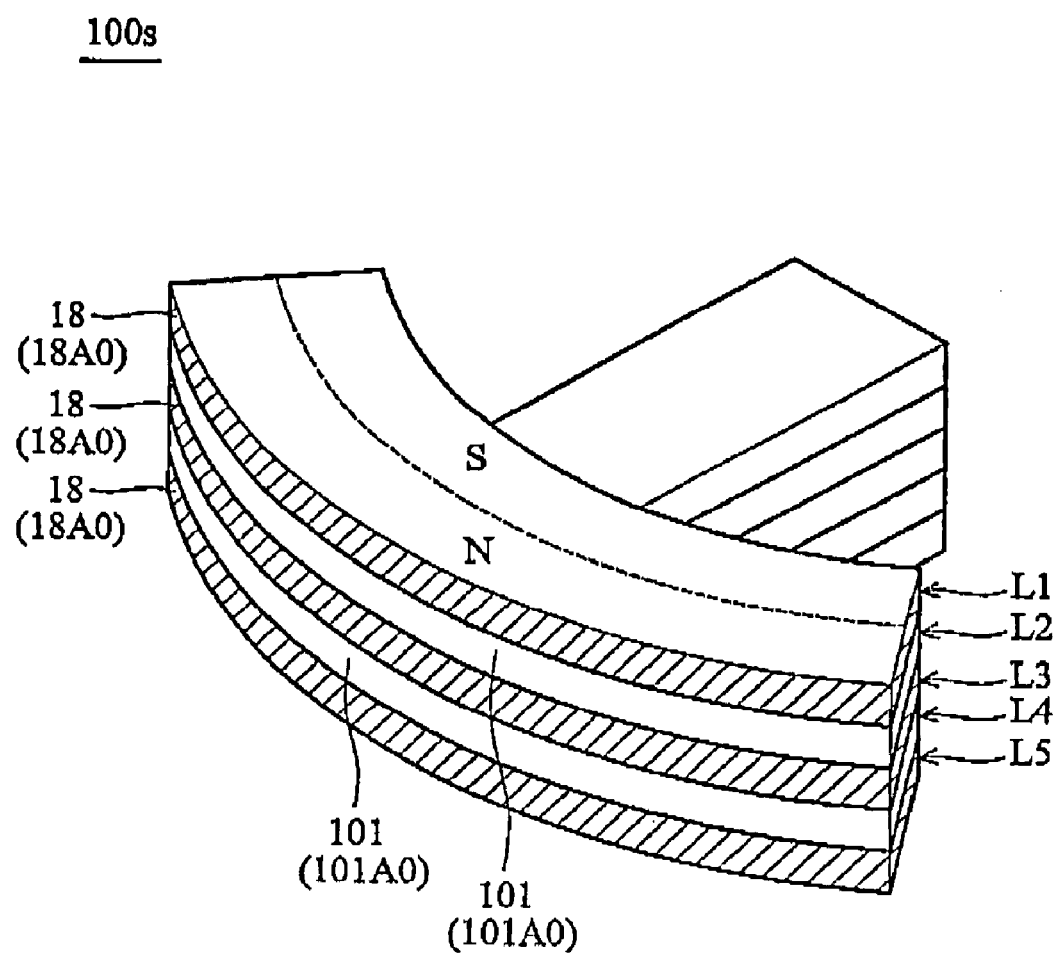
FIG. 3 shows the structure of an embodiment of a salient pole.

FIG. 3 shows the structure of an embodiment of a salient pole 100s. Each salient pole, or magnetic pole, comprises a plurality of magnetic conductive layers 101 and a plurality of permanent magnets 18 to form five layers L1, L2, L3, L4 and L5.

Corresponding to the layers L1, L2, L3, L4 and L5, from the top to the bottom, the salient pole 100s has a first layer L1 comprising a permanent magnet 18 with a magnetic pole 18A0, a second layer L2 comprising a magnetic conductive sheet 101 with a magnetic pole 101A0, a third layer L3 comprising the permanent magnet 18 with a magnetic pole 18A0, a fourth layer L4 comprising a magnetic conductive sheet 101 with a magnetic pole pole 101A0, and a fifth layer L5 comprising the permanent magnet 18 with a magnetic pole 18A0.

In the layer L2 or L4, the magnetic pole 101A0 of the magnetic conductive sheet 101 of the salient pole 100s is referred as a first salient pole. The layer L2 or L4 comprising the first salient pole 101A0 is defined as a magnetic conductive layer. In the layer L1, L3 or L5, the magnetic pole 18A0 of the permanent magnet 18 of the salient pole 100' comprises a second salient pole (S-pole) and a third salient pole (N-pole). The layer L1, L3 or L5 is defined as a first auxiliary magnetic polar layer for the stator 150. In other embodiments, each auxiliary magnetic polar layer with the permanent magnet 18 can be selectively disposed above the magnetic conductive layers 101, below the magnetic conductive layers 101, or between two magnetic conductive layers 101.

Figure 4A:
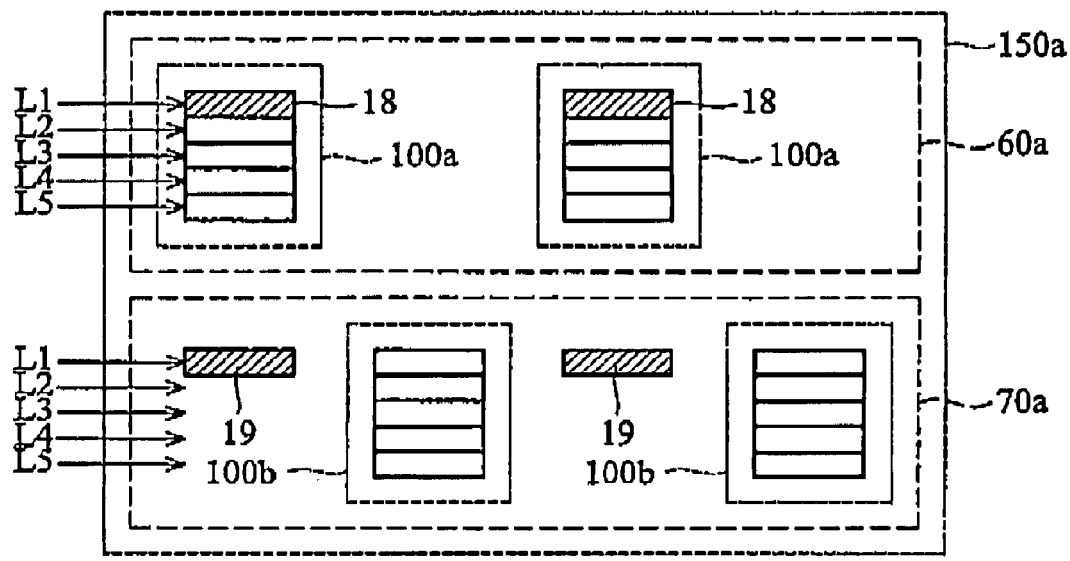
FIGS. 4A-4C show methods for disposing an auxiliary magnetic polar layer of an embodiment of a stator structure.
Figure 4B:
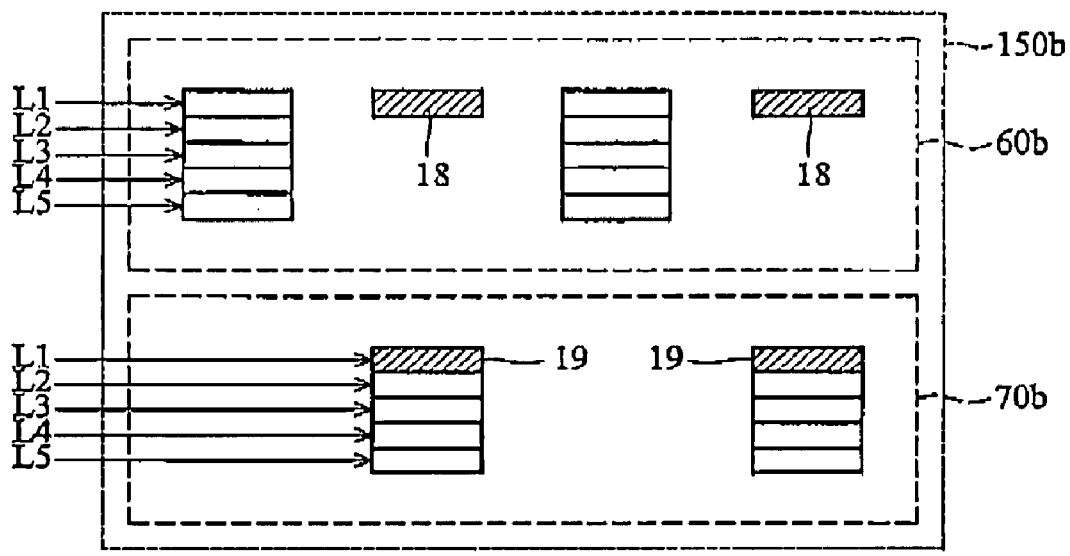
Figure 4C:
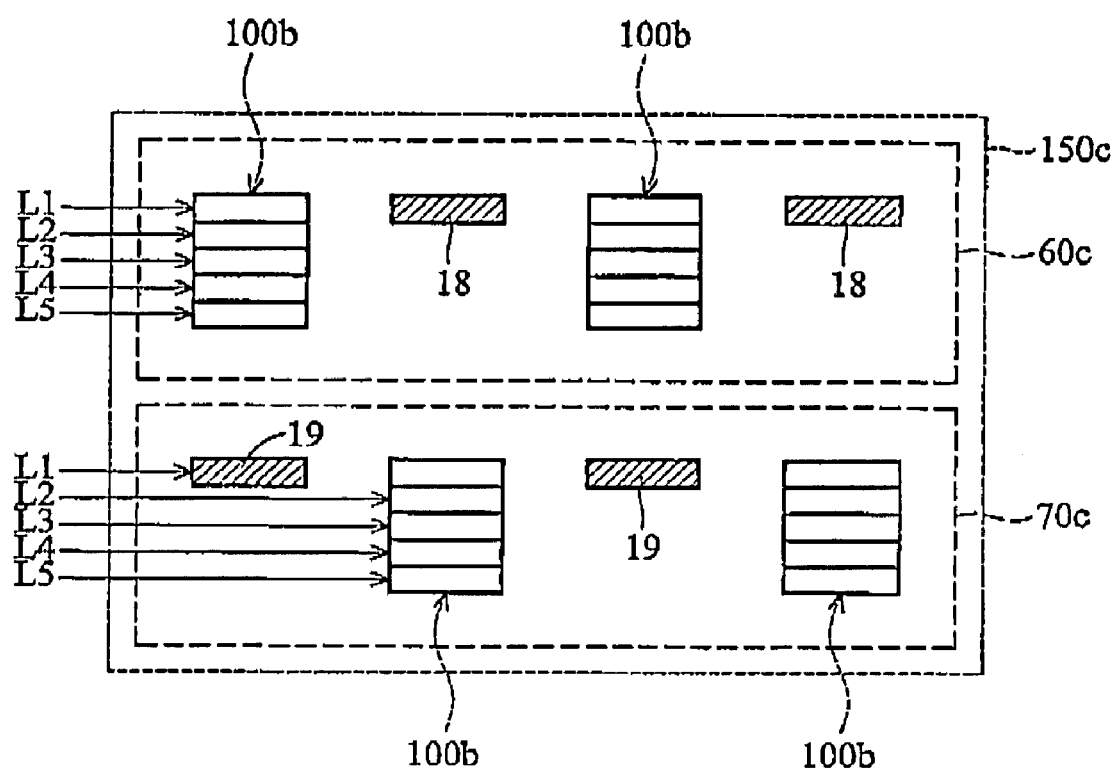

FIGS. 4A-4C show different deployments of the magnetic conductive layer and the auxiliary magnetic polar layer of three stators 150a, 150b and 150c.

In FIGS. 4A and 4B, in the first portion 60a/60b and the second portion 70a/70b of the stators 150a/150b corresponding to the layers L1, the two permanent magnets 18 and 19 are parallel and corresponded polarities of the outer edges of the permanent magnets 18 and 19 are magnetically identical. For example, in FIG. 4A, the permanent magnet 18 of the salient polo 100a of the first portion 60a is located at top thereof, and the permanent magnet 19 is disposed between the two salient poles 100b of the second portion 70a. The outer edges of the two permanent magnets 18 and 19 are magnetically identical, such as N-pole (third salient pole) or S-pole (second salient pole).

In FIG. 4C, in the layers L1, the two permanent magnets 18 and 19, disposed between two salient poles 100b in the first portion 60c and the second portion 70c, respectively, are interlaced. The polarities of the outer edges of the two permanent magnets 18 and 19 are magnetically opposite. For example, the polarities of the outer edges of the two permanent magnets 18 and 19 are magnetically N-pole (third salient pole) and S-pole (second salient pole), respectively.

Figure 5:
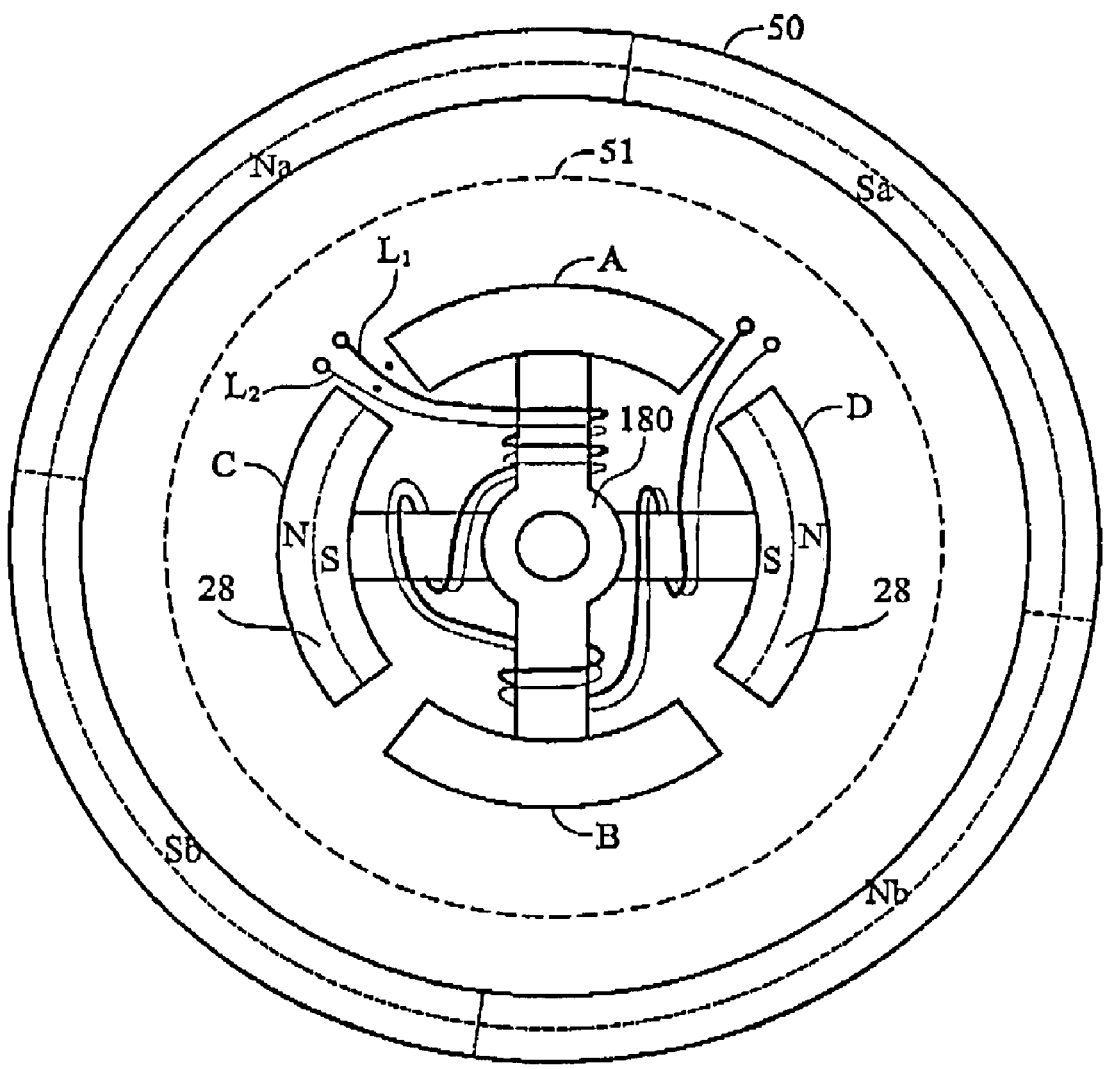
FIG. 5 shows the structure of a third embodiment of a brushless direct current (DC) motor.

FIG. 5 shows the structure of a brushless direct current (DC) motor M3 of a third embodiment. The brushless DC motor M3 comprises a rotor 50 and a stator 51. The stator 51 comprises a yoke 180 with four arms, a plurality of salient poles A, B, C, and D, and a plurality of permanent magnets 28. The stator 51 is a radial stator structure. At least one of the permanent magnets 28 is disposed on at least one of the salient poles A, B, C and D. For example, in this embodiment, two permanent magnets 28 are disposed on the top of the salient poles C and D, respectively. The rotor 50 is an annular magnet coaxially with and outside the stator, wherein poles Sa and Sb are magnetically S-pole, and poles Na and Nb are magnetically N-pole. When necessary, the rotor 50 can be disposed inside the stator 51.

FIGS. 6A-6F show different deployments of the magnetic conductive layer and the auxiliary magnetic polar layer of six stators 51a, 51b, 51c, 51d, 51e and 51f. In general, polarities of the outer edges of two permanent magnets located on the top of two opposite salient poles A and D are magnetically identical, and polarities of outer edges of two permanent magnets on two adjacent salient poles are magnetically opposite.

Figure 6A:
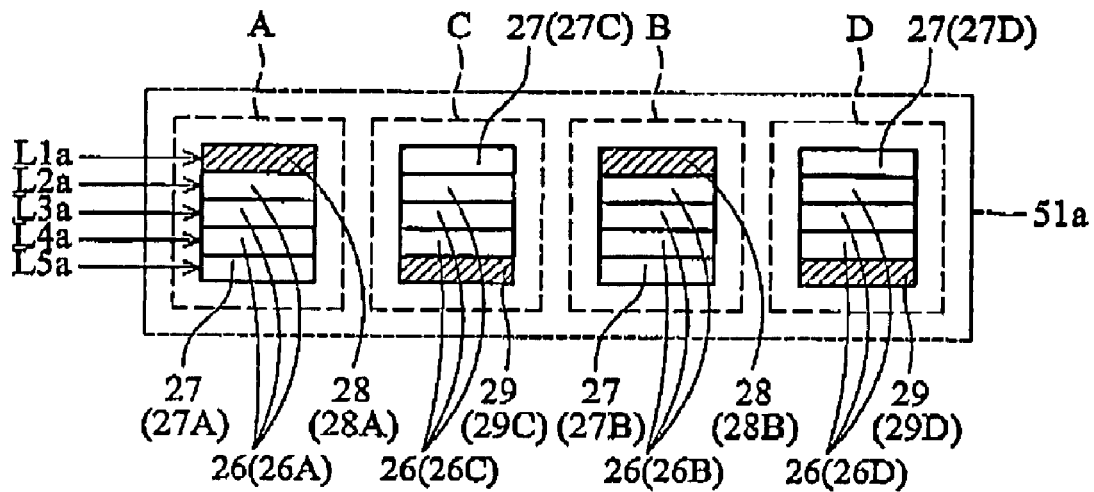
FIGS. 6A-6F show methods for disposing an auxiliary magnetic polar layer of an embodiment of a stator structure.
Figure 6B:
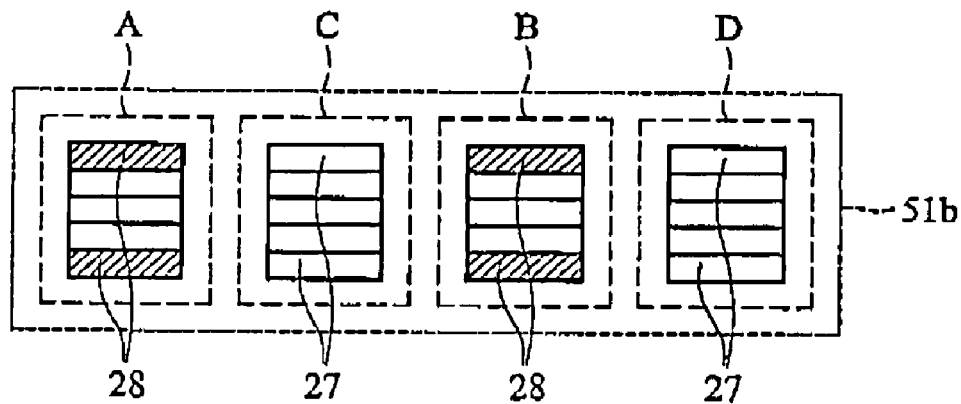
Figure 6C:
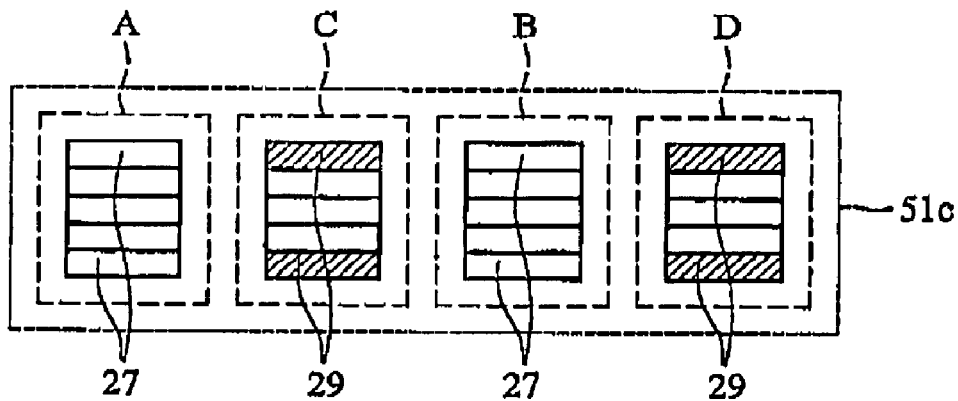

In FIG. 6A, the stator 51 comprises four magnetic poles A, B, C, and D, and each magnetic pole A, B, C and D comprises five magnetic sub-poles. For example, corresponding to the layers L1a, L2a, L3a, L4a and L5a, from the top to the bottom, the magnetic pole A has five magnetic sub-poles 28A, 26A, 26A, 26A and 27A, the magnetic pole C has five magnetic sub-poles 27C, 26C, 26C, 26C and 29C, the magnetic pole B has five magnetic sub-poles 28B, 26B, 26B, 26B and 27B, and the magnetic pole D has five magnetic sub-poles 27D, 26D, 26D, 26D and 29D. The layer L1a having the permanent magnet(s) 28 (sub-poles 28A and 28B) and the magnetic conductive sheet(s) 27 (sub-poles 27C and 27D) corresponding to the permanent magnet(s) 28 is defined as a first auxiliary magnetic polar layer.

The layer L5a having the permanent magnet(s) 29 (sub-poles 29C and 29D) and the magnetic conductive sheet(s) 27 (sub-poles 27A and 27B) corresponding to the permanent magnet(s) 29 is defined as a second auxiliary magnetic polar layer. The layers L2a, L3a and L4a having three magnetic conductive sheets 26 (sub-poles 26C) located at the middle of the magnetic pole A, three magnetic conductive sheets 26 (sub-poles 26C) located at the middle of the magnetic pole C, three magnetic conductive sheets 26 (sub-poles 26B) located at the middle of the magnetic pole B and three magnetic conductive sheets 26 (sub-poles 26D) located at the middle of the magnetic pole D are defined as a set of magnetic conductive layers. That is to say, the first and second auxiliary magnetic polar layers L1a and L5a (comprising the permanent magnets 28 and 29) are located onto and/or below the set of magnetic conductive layers L2a, L3a and L4a (comprising three magnetic conductive sheets 26).

The first auxiliary magnetic polar layer L1a comprises four sub-poles 28A, 27C, 28B and 27D, the second auxiliary magnetic polar layer L5a comprises four sub-poles 27A, 29C, 27B and 29D, and each magnetic conductive layer L2a, L3a and L4a comprises four sub-poles 26A, 26C, 26B and 26D. Thus, the number of the sub-poles of the first or second auxiliary magnetic polar layers L1a and L2a is equal to the one of the sub-poles of each magnetic conductive layer L2a, L3a and L4a.

In FIG. 6A, if the outer edge of the permanent magnet 28 of the salient pole A is magnetically N-pole, the outer edge of the permanent magnet 28 of the opposite salient pole B is magnetically N-pole, and the outer edges of the permanent magnet 29 of the adjacent salient poles C and D are both magnetically S-pole. In FIGS. 6A-6F, locations 27 corresponding to the permanent magnets 28 and 29 can be made by silicon steel, ferromagnetic material, permanent magnets, soft magnetic material, plastic magnets, rubber magnets, magnet-cored plastics, or non-magnetic conductive material such as plastics. If the material at location 27 is magnetic, the polarity of material at locations 27 and the corresponding permanent magnet 28 or 29 are magnetically opposite. Alternatively, the corresponding locations 27 can be holes.

Figure 6D:
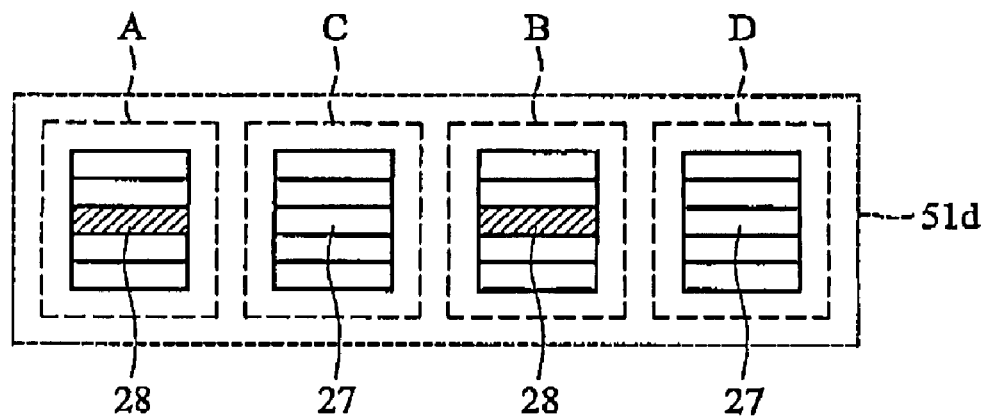
Figure 6E:
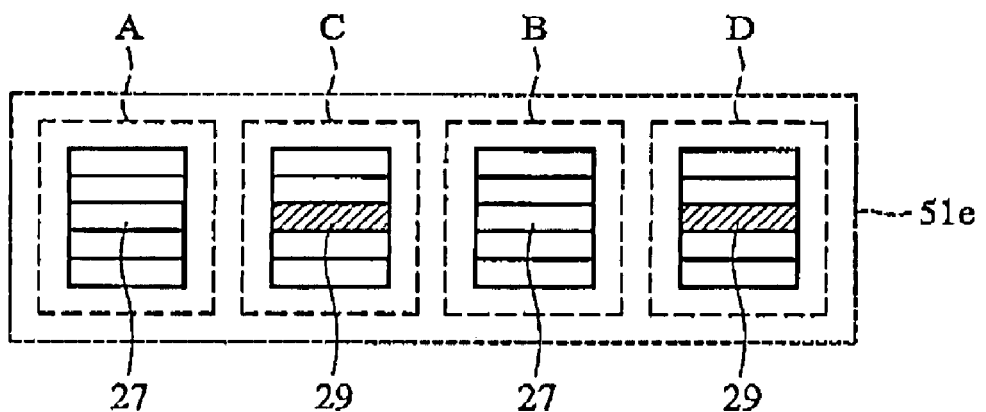
Figure 6F:
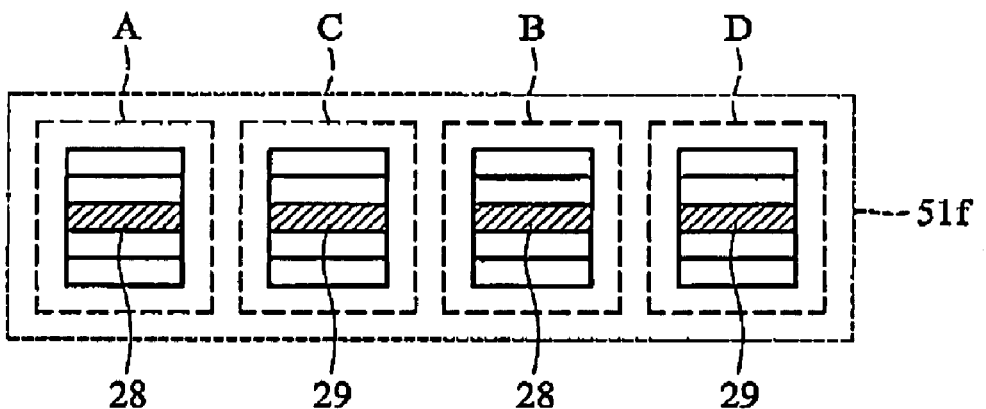

In the stators 51d, 51e and 51f of FIGS. 6D-6F, the layer comprising the permanent magnet 28 or 29 (middle sub-pole) is a middle layer (auxiliary magnetic polar layers comprising sub-pole). I.e., the layer comprising the permanent magnet 28 or 29 is disposed between two upper magnetic conductive layers and two lower magnetic conductive layers. The permanent magnet 28 or 29 is made of permanent magnetic material, such as a permanent magnet, a plastic magnet, a rubber magnet, or a magnet-cored plastic. The salient pole is made of magnetic conductive material, such as ferromagnetic material or soft magnetic material.

Figure 7:
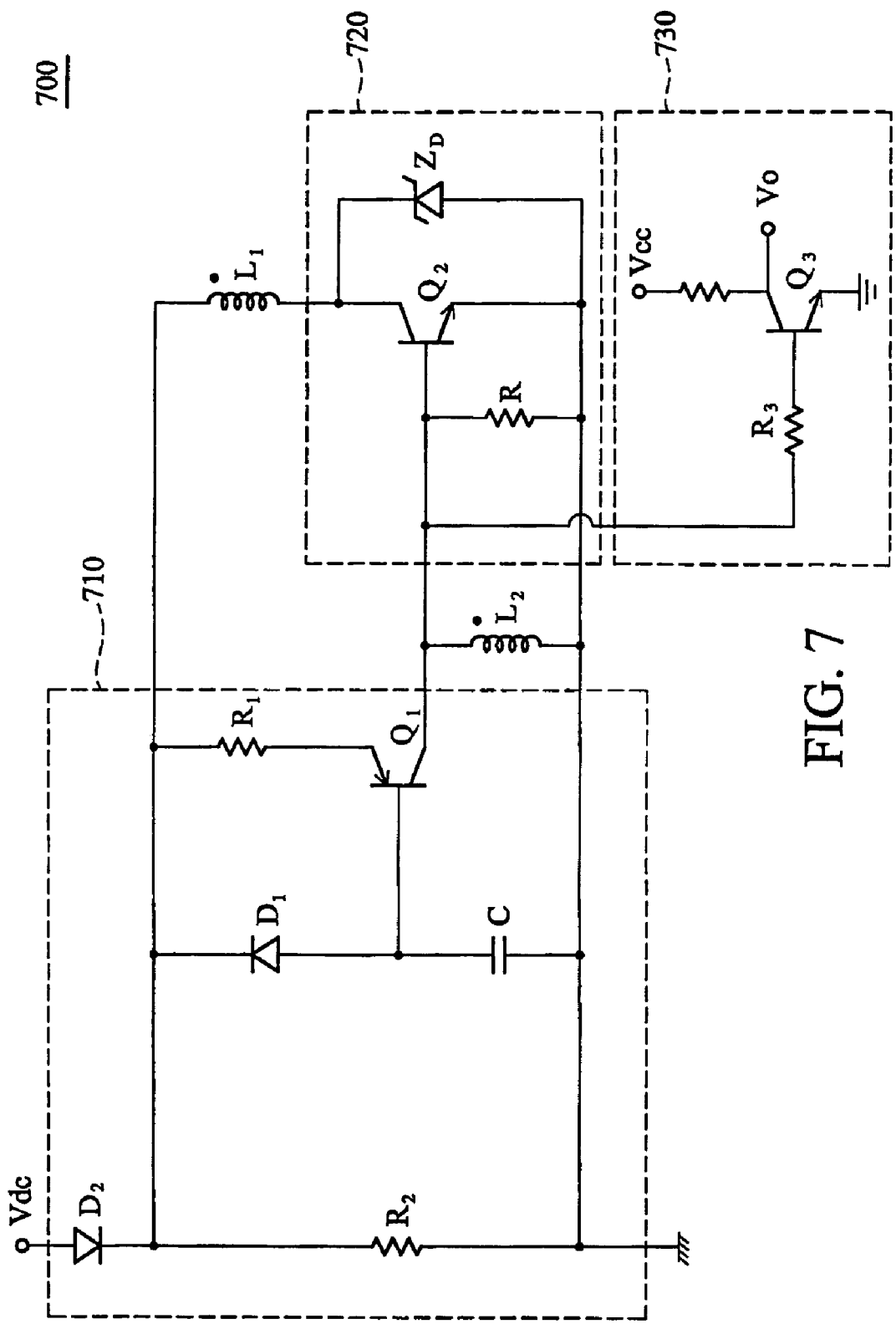
FIG. 7 shows a driving circuit of an embodiment of a brushless DC motor.

FIG. 7 shows a driving circuit of an embodiment of a brushless DC motor. The driving circuit 700 comprises a power coil L1, a conduction coil L2, a start-up device 710, a control device 720, and a voltage detection device 730. The driving circuit 700 is described as below in reference to the brushless DC motor in FIG. 5. The power coil L1 in FIG. 5 and the power coil L1 in FIG. 7 are the same. The conduction coil L2 in FIG. 5 and the conduction coil L2 in FIG. 7 are the same. A diode D2 is added at a DC current input end (Vdc) to prevent reverse current. Resistors R, R1, R2, and R3 are added in the driving circuit 700 to prevent overflow current. A Zener diode $Z_D$ is added in the control device 720 to stabilize voltage.

If the DC current Vdc is 12V, the transistor Q1 is a PNP transistor, the transistor Q2 is a NPN transistor, and the permanent magnet 28 is magnetically N-pole. When the start-up device is coupled to the DC current Vdc, the transistor Q1 is turned on due to a reverse base-emitter voltage (12V) greater than a reverse junction voltage (0.7V). When the transistor Q1 is turned on, the DC current Vdc charges the capacitor C through the current limiting resistor R1 and the transistor Q1. A start-up voltage is output from a collector of the transistor Q1.

When the control device 720 receives the start-up voltage, the transistor 2 is turned on because a base-emitter forward bias is greater than a junction voltage (0.7V). Thus, a current from the start-up device 710 flows into the control device 720 through the power coil L1.

According to the right-hand principle, the direction of a current on a coil determines magnetic pole of a conducted magnetic field. Thus, the salient poles A and B of the stator are conducted to be N-pole, and the poles C and D of the stator are conducted to be S-pole. The pole Sa of the rotor 50 is attracted by the salient pole A and rejected by the salient pole D, the pole Sb thereof is attracted by the salient pole B and rejected by the salient pole C, thereby driving the rotor 50 to rotate.

When the control device 720 is continuously coupled to the DC current Vdc, the control device 720 determines whether the start-up device should stop output of a start-up signal according to electric power stored in the capacitor C.

In FIG. 7, when a voltage level of the capacitor C increases, the reverse base-emitter voltage of the transistor Q1 decreases. When the reverse base-emitter voltage thereof is below the junction voltage (0.7V), the transistor Q1 is turned off, thereby stopping output of the start-up voltage. Thus, the transistor Q2 is turned off, and no current flows through the power coil L1. The conducted magnetic field of the stator disappears, and the rotor 50 rotates by a particular angle, which is 90 degree counterclockwise in this example.

In first state, the permanent magnets 28 on the salient poles C and D attract poles Sa and Sb of the rotor 50 respectively to drive the rotor 50 to continue rotating forward.

In second state, when the permanent magnet 28 attracts the rotor 50 to drive the rotor 50 to rotate, the conduction coil L2 generates a conduction signal, such as a conduction voltage. When the control device 720 receives the conduction signal, the transistor Q2 is turned on. The DC current Vdc flows through the power coil L1. The outer edges of the salient poles A and B of the stator are conducted to be N-pole again, and the outer edges of the poles C and D of the stator are conducted to be S-pole again. Due to the magnetic force of the poles C and D being greater than that of the permanent magnet 28, the rotor 50 is driven by an attraction force between the poles C and D and the poles Sa and Sb to continue rotating forward in the same direction.

In third state, when the salient poles C and D attract the rotor 50 to drive the rotor 50 to rotate, the salient poles C and D and the permanent magnet 28 are magnetically opposite, and thus the conduction coil L2 generates a reverse conduction signal, such as a reverse conduction voltage. Therefore, the reverse base-emitter voltage of the transistor Q2 is below the junction voltage, so the transistor Q2 is turned off.

When the transistor Q2 is turned off, no current flows through the power coil L1. The conducted magnetic field of the stator disappears, and the rotor 50 continues rotating forward in the same direction to return to the first state.

The torque of the rotor 50 is provided half by the conducted magnetic field generated by the power coil L1 and half by the permanent magnet 28.

Similar operations can be derived for the driving circuit 700 used in the brushless DC motor in FIG. 2.

The voltage detection device 730 detects the conduction signal. When the rotor 50 rotates, the brushless DC motor operates in the first, the second, and the third state alternately. The conduction coil L2 generates the conduction voltage and the reverse conduction voltage alternately, so the transistor Q3 is turn on and off alternately. Thus, a high-low signal is generated, for example a square wave pulse signal. After calculation, the rotational speed of the rotor 50 can be obtained. The high-low signal can be a voltage signal or a current signal. An extra DC current Vcc can be added in the voltage detection device 730 to control a high-low rate of an output voltage.

Figure 8:
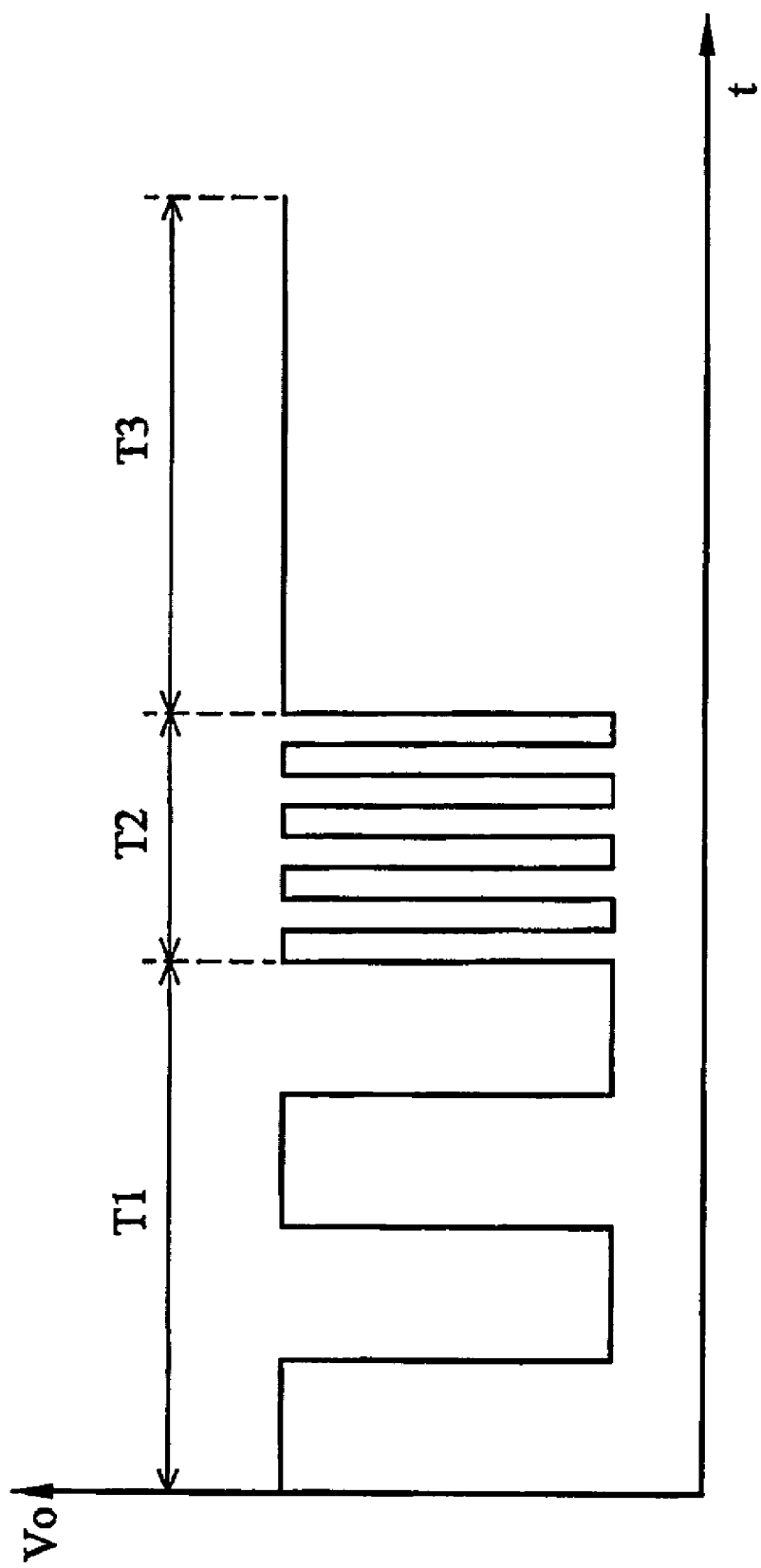
FIG. 8 is an output voltage to time graph when a brushless DC motor rotates.

FIG. 8 is an output voltage to time graph when a brushless DC motor rotates. The horizontal axis represents time t, and the vertical axis represents output voltage V0. The wave corresponding to T1 is the output wave when the rotational speed of the rotor 50 becomes slow due to dust or other objects. The wave corresponding to T2 is the output wave when the rotor 50 operates normally. The wave corresponding to T3 is the output wave when the rotor 50 stops rotating.

When the rotor 50 stops rotating, the conduction coil L2 stops generating the conduction voltage, the transistors Q1, Q2, and Q3 are all turned off. Thus, no undesired current flows into the power coil L1, the transistors Q1, Q2, and Q3, and the conduction coil L2.

In some embodiments of a brushless DC motor, when the rotor 50 stops rotating, no undesired current flows into any active component or coil of the driving circuit, preventing overheating or burn-out. Any malfunctions can be easily eliminated by coupling the brushless DC motor to the DC current Vdc again so as to restore operation.

Thus, the disclosed driving device 700 can potentially stabilize the brushless DC motor.

The start-up device 710 further comprises a power-releasing device comprising a diode D1 and a resistor R2. When the start-up device 710 is disconnected from the DC current Vdc, the power-releasing device releases electric power stored in the capacitor C by discharging the capacitor C through the diode D1 and the resistor L2. Thus, the capacitor C is re-charged when the start-up device 710 is again coupled to the DC current Vdc.

An embodiment of the stator structure is appropriate for a motor or a fan with coils axially or radially wound thereon.

While the invention has been described by way of example and in terms of several embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A stator structure, comprising:
   at least a yoke with at least an arm;
   at least a magnetic conductive layer connected to the arm and comprising a plurality of first salient poles; and
   at least a first auxiliary magnetic polar layer disposed above the magnetic conductive layer, below the magnetic conductive layer, or between two magnetic conductive layers, and comprising at least a second salient pole and a third salient pole, and the second salient pole comprises permanent magnetic material.

2. The stator structure as claimed in claim 1, wherein the magnetic conductive layer comprises ferromagnetic material or soft magnetic material.

3. The stator structure as claimed in claim 1, wherein the permanent magnetic material is a permanent magnet, a rubber magnet, a plastic magnet, or a magnet-cored plastic.

4. The stator structure as claimed in claim 1, wherein the third salient pole is a non-magnetic conductive material pole, a permanent magnetic material pole, a ferromagnetic material pole, a soft magnetic material pole, a rubber magnet, a plastic magnet, a magnet-cored plastic pole, or a hole.

5. The stator structure as claimed in claim 1, wherein the third salient pole comprises permanent magnetic material, and the second salient pole and the third salient pole are magnetically opposite.

6. The stator structure as claimed in claim 1, further comprising at least a second auxiliary magnetic polar layer disposed below the magnetic conductive layer or between two magnetic conductive layers and comprising at least a fourth salient pole and a fifth salient pole, wherein the fourth and the fifth salient poles are disposed corresponding to positions of the second and the third salient poles respectively, and the fourth salient pole comprises permanent magnetic material.

7. The stator structure as claimed in claim 6, wherein the fifth salient pole is a non-magnetic conductive material pole, a permanent magnetic material pole, a ferromagnetic material pole, a soft magnetic material pole, a rubber magnet, a plastic magnet, a magnet-cored plastic pole, or a hole.

8. The stator structure as claimed in claim 6, wherein the fifth salient pole comprises permanent magnetic material, and the fourth salient pole and the fifth salient pole are magnetically opposite.

9. The stator structure as claimed in claim 6, wherein the second salient pole and the fourth salient pole are magnetically identical.

10. A stator structure, comprising:
    at least a yoke with at least an arm;
    at least a magnetic conductive layer connected to the arm and comprising a plurality of first salient poles; and
    at least a first auxiliary magnetic polar layer comprising at least a second salient pole, wherein the second salient pole comprises permanent magnetic material; the first salient pole and the second salient pole are interlaced.

11. The stator structure as claimed in claim 10, wherein the first auxiliary magnetic polar layer is disposed above the magnetic conductive layer, below the magnetic conductive layer, or between two magnetic conductive layers.

12. The stator structure as claimed in claim 10, wherein the first auxiliary magnetic polar layer further comprises at least a third salient pole and the total number of the second and the third salient poles is equal to that of the first salient poles.

13. The stator structure as claimed in claim 12, wherein the third salient pole is a non-magnetic conductive material pole, a permanent magnetic material pole, a ferromagnetic material pole, a soft magnetic material pole, a rubber magnet, a plastic magnet, a magnet-cored plastic pole, or a hole.

14. The stator structure as claimed in claim 12, wherein the third salient pole comprises permanent magnetic material, and the second salient pole and the third salient pole are magnetically opposite.

15. The stator structure as claimed in claim 10 further comprising at least a second auxiliary magnetic polar layer comprising at least a fourth salient pole and a fifth salient pole, wherein the fourth and the fifth salient poles are disposed corresponding to positions of the second and the third salient poles respectively, and the fourth salient pole comprises permanent magnetic material.

16. The stator structure as claimed in claim 15, wherein the second auxiliary magnetic polar layer and the magnetic conductive layer are interlaced.

17. The stator structure as claimed in claim 15, wherein the second auxiliary magnetic polar layer is disposed above the magnetic conductive layer, below the magnetic conductive layer, or between two magnetic conductive layers.

18. The stator structure as claimed in claim 15, wherein the first and the second auxiliary magnetic polar layers are symmetrically disposed or interlaced.

19. The stator structure as claimed in claim 15, wherein the second salient pole and the fourth salient pole are magnetically identical.

* * * * *